Patented Apr. 25, 1939

2,155,922

UNITED STATES PATENT OFFICE 2,155,922

METHOD OF PREPARING ORGANIC MERCURY COMPOUNDS

Carl N. Andersen, Wellesley Hills, Mass., assignor to Lever Brothers Company, a corporation of Maine No Drawing. Application September 14, 1936, Serial No. 100,678

16 Claims. (Cl. 260—242)

The present invention relates to a method of preparing organic mercury compounds, and more particularly to a method of preparing compounds of the general formula $(RHg)_x.R_1$, in which R represents an aromatic structure to a carbon atom of which the mercury is attached, and in which none of the nuclear or side chain carbons has direct linkage with any element other than hydrogen, carbon or mercury; in which $R_1$ represents a radical of a compound having an imino group or groups linked to the RHg group or groups through replacement of the imino hydrogen atom or atoms; and in which $x$ represents the number of RHg groups in the compound and is an integer having a value of at least one and not more than the number of replaceable imino hydrogens in the imino compound. The expression "aromatic structure" as used herein is intended to be generic and include an aromatic nucleus with or without side chains.

The radical R may be any mono or poly-cyclic hydrocarbon group having a nucleus in which all of the nuclear carbons, other than the one attached to mercury, and any side chain carbons, have their valences satisfied by hydrogen or another carbon. Examples are the phenyl, diphenyl, naphthyl, xylyl, and tolyl groups.

The radical $R_1$ may be the radical of any compound containing an imino group. The expression "imino group" herein refers to the group: =NH, and the expression "imino compound" herein refers to any compound containing an NH group. Included in the above terms are the "imido group" and "imido compounds", respectively, which are species, i. e. an imide is an acylated imine. $R_1$ therefore refers to organic compounds in which the NH group is attached directly to hydrocarbon radicals or residue and to compounds in which the NH group is linked to a residue through a carbonyl group. The compounds may be either aliphatic or cyclic and the imino group may be part of a cyclic structure.

I have found that when any aromatic mercury salt of the RHg type, particularly a relatively soluble salt, for example, a carboxylate, is brought under suitable reacting conditions into the presence of a compound having an imino group or groups and containing a replaceable imino hydrogen atom, the aromatic mercury radical is substituted for the imino hydrogen in the imino compound, thereby producing a new type of compound characterized by high germicidal properties and relatively low toxicity and other desirable properties.

The acid radical which is combined with the aromatic mercury radical in the salt, is regenerated as the free acid in the reaction, and may be separated from the new compound without difficulty due to the fact that it is usually relatively soluble in water. The aromatic mercury imides which form in the reaction usually have a relatively low solubility so that the separation of the new compound in its pure form presents no difficulty.

The aromatic mercury salts which I have found to be particularly suitable for effecting the desired substitution of the imino hydrogen are those which are relatively soluble in water and other inert liquids. Those salts which I have found to be particularly adapted for use in this method are the acetate and the lactate. Both of these salts have relatively high solubility as compared with most aromatic mercury compounds and this solubility facilitates bringing the components into proper reacting relation. Phenylmercury acetate for example has a solubility of about 1 part and phenylmercury lactate has a solubility of about 1.75 parts in 100 parts of water at 20° C. It will be understood, however, that any other aromatic mercury salt may be used. The method comprising my invention may be practiced by bringing together the aromatic mercury salt and the imino compound under any suitable reacting conditions. This is generally most conveniently accomplished by employing a reacting medium, such as any inert liquid. For example the aromatic mercury salt may be dissolved or suspended in a liquid and this added to the imino compound, or the imino compound may be added to a liquid containing aromatic mercury salt. The imino compound likewise may first be placed in a liquid and to this the aromatic mercury salt may be added either in a solution or in solid form. Any inert liquid may be employed as the medium for carrying out the reaction, inasmuch as its only function is to bring the reacting components together in a form whereby the reaction may proceed. Water is convenient to use because of its availability; other solvents are equally as satisfactory, such as the lower alcohols, benzol, acetone, or any other suitable inert organic solvent or mixtures of any of these with each other or with water.

In carrying out my process theoretical quantities of the imino compound and the aromatic mercury salt are employed, but in some instances, as in some of the examples to be set forth, a small excess of the imino compound may be employed. This insures the complete conversion of the aromatic mercury constituent into the desired aromatic mercury imine. This procedure may be adopted particularly in cases in which the imino compounds are relatively soluble as compared with the aromatic mercury imines thereof, so that no problem is presented in separating the excess imine from the compound produced in the reaction. It is not essential to employ this excess because in most instances the new compound is relatively insoluble as compared with the aromatic mercury salt employed making it possible to free the reaction product not only from the regenerated acid but from any unconverted aromatic mercury salt.

If the imino compound contains more than one imino group, one or more, including all, of the imino hydrogens may be replaced by the RHg group by utilizing the proper amounts of the reacting components, or one or more of the imino hydrogens may be replaced by the RHg group and some other organic or inorganic monovalent group.

The process may be carried out at any reacting temperature, for example room temperature. It is generally convenient, however, to use heat inasmuch as this facilitates the solubility of the reacting components and speeds the reaction.

My process may be applied to any imino compound and the following examples are given as merely illustrative of my invention as heretofore described:

Example 1

6.72 grams of phenylmercury acetate is dissolved in 2 liters of water by heating to boiling. The solution is then filtered to remove any gums or other insoluble materials present. To the filtrate is added 1.41 grams of barbituric acid dissolved in 200 cc. of water. A precipitate forms immediately. The mixture is allowed to stand for 12 hours before filtering. The precipitate is washed thoroughly with warm water and dried in an oven at 110° C. The resulting product is a white crystalline powder which is sparingly soluble in water. The melting point is in excess of 270° C. The product is the compound phenylmercury barbiturate.

Many substituted derivatives of barbituric acid, for example, diethyl barbituric acid and thiobarbituric acid may also be prepared in a manner similar to that set forth above.

Example 2

20.16 grams of phenylmercury acetate is dissolved in 4 liters of water. The solution is then filtered and to the filtrate is added an aqueous solution of 3.76 grams of parabanic acid. The mixture is brought to boiling and then allowed to cool and stand for 24 hours. The white precipitate which forms is then filtered, washed well with warm water and dried. The product is sparingly soluble in water and melts in excess at 287° C. It is the compound phenylmercury parabanate.

Example 3

20.16 grams of phenylmercury acetate is dissolved in 4 liters of water by heating to boiling. The solution is then filtered and to the filtrate is added an aqueous solution of 9.70 grams of phthalimide. The mixture is brought to boiling and then allowed to stand for 24 hours. The resulting precipitate is filtered, washed with distilled water and then dried. This product is sparingly soluble in water and melts at 210-212° C. It is the compound phenylmercury phthalimide.

Phenylmercury phthalimide may also be prepared by adding 20.16 grams of phenylmercury acetate to 1 liter of alcohol at room temperature and agitating the mixture to facilitate solution. The solution is filtered and to the filtrate is added a filtered solution of approximately 9.7 grams of phthalimide dissolved in 600 cc. of alcohol at room temperature. Upon concentration of the solution to a smaller volume, a crystalline mass forms which is separated by filtration, washed with alcohol and dried.

Example 4

20.16 grams of phenylmercury acetate is added to 2 liters of water and the mixture is heated to facilitate solution. The solution is filtered to remove any insoluble material and to the filtrate is added 12.07 grams of saccharin (o-benzoic sulfimide) dissolved in 500 cc. of water. A white precipitate results and the mixture is allowed to stand after which the precipitate is separated by filtration, washed with warm water and dried. The product has a melting point of 214-215.5° C. and is the compound phenylmercury o-benzoic sulfimide.

Example 5

20.16 grams of phenylmercury acetate is dissolved in 2 liters of water and heated to facilitate solution. The solution is filtered to remove any insoluble material. To the filtrate is added 6.54 grams of succinimide dissolved in 100 cc. of water. A clear solution results but upon standing a precipitate forms which is separated by filtration, washed well with warm water and dried. The product is the compound phenylmercury succinimide; it has a melting point of 187-188° C.

Example 6

40 grams of phenylmercury acetate is dissolved in 2 liters of water and heated to facilitate solution. The solution is filtered to remove any insoluble material. To the filtrate is added 8.88 grams of pyrrole dissolved in 50 cc. of alcohol. A milky solution results and the mixture is evaporated to one-half its volume and permitted to stand. The precipitate which forms is separated by filtration and recrystallized. It melts at 147-148° C. Upon recrystallization from alcohol the product melts at 132° C. and decomposes at 158° C. It is the compound phenylmercury pyrrole.

Example 7

20.16 grams of phenylmercury acetate is dissolved in 4 liters of water and heated to facilitate solution. The solution is filtered to remove any insoluble material. To the filtrate is added an aqueous solution containing 13 grams of naphthalimide. The precipitate which forms is separated by filtration, washed and dried and is then recrystallized from alcohol. The melting point of the recrystallized product is 181-182° C.; it is the compound phenylmercury naphthalimide.

Example 8

80.64 grams of phenylmercury acetate is added to 4 liters of water and heated to facilitate solution. The solution is filtered to remove any foreign or insoluble material. To the filtrate is added 38.8 grams of indole dissolved in 200 cc. of alcohol. A milky solution results and the mixture is allowed to stand; crystals separate upon the sides and bottom of the container. The crystals are removed by filtration, washed with alcohol and warm water and dried. The product is the compound phenylmercury indole and has a melting point of 155-156° C.

Example 9

40.32 grams of phenylmercury acetate is added to 4 liters of water and heated to facilitate solution after which the solution is filtered to remove any remaining insoluble material. To the filtrate is added 37.18 grams of carbazole dissolved in 1 liter of alcohol. A voluminous white precipitate results upon the addition of the alcoholic solution of carbazole. The mixture is allowed to stand and the precipitate is then separated by filtration, washed with warm water and dried. The product, after being recrystallized from alcohol, has a melting point of 216-218° C. and is the compound phenylmercury carbazole.

Example 10

20.16 grams of phenylmercury acetate is dissolved in 2 liters of water and heated to facilitate solution. The solution is filtered to remove any remaining insoluble material. To the filtrate is added 5.61 grams of piperidine dissolved in 50 cc. of alcohol. A precipitate results which is separated by filtration, washed well with warm water and dried. The product is a white solid which melts at 171° C. and is the compound phenylmercury piperidine.

Example 11

40.32 grams of phenylmercury acetate is added to 2 liters of alcohol and heated to facilitate solution. The solution is filtered; to the filtrate is added 6.86 grams of piperazine hydrate (diethylene diimine). A clear solution results and the volume of the solution is reduced by evaporation. A white crystalline solid separates which is removed by filtration. It has a melting point of 134-136° C. and is the compound phenylmercury piperazine.

It will be obvious that the procedure outlined above may be followed in preparing other aromatic mercury products of the imino group containing compounds; that is to say chemical equivalent quantities of the aromatic mercury salt and the imino group containing compound are brought together under suitable reacting conditions and after allowing the reaction to proceed the products are separated. Other imino compounds to which I have applied my invention include 3-nitro phthalimide, quinone imine, theobromine, uric acid, xanthine, isatin, and various other imino compounds.

Various modifications in the details of the procedure may be employed without departing from the scope of the invention which is not to be deemed as limited by the illustrations or in any way except as indicated in the appended claims.

By the term "residue" is meant that portion of an imine or an imide compound that remains after the removal of the =NH group from the compound.

This application is a continuation in part of application Serial No. 694,200, filed October 18, 1933.

I claim:

1. The method of preparing an organic mercury compound wherein an aromatic mercury group is linked with a compound containing an =NH group by replacement of the hydrogen of the =NH group, which comprises reacting in an inert liquid medium a compound containing an =NH group in which both bonds thereof are joined to a bivalent residue, with a soluble aromatic mercury salt of a soluble acid in which mercury is directly connected by one of its valences to the acid radical in the salt and by its other valence to a carbon of an aromatic structure in which none of the carbon atoms has direct linkage with any element other than hydrogen, carbon or mercury.

2. The method of preparing an organic mercury compound wherein an aromatic mercury group is linked with a compound containing an =NH group by replacement of the hydrogen of the =NH group, which comprises reacting in an inert liquid medium a compound containing an =NH group in which both bonds thereof are joined to a bivalent residue, with a soluble aromatic mercury carboxylate of a soluble carboxylic acid in which mercury is directly connected by one of its valences to the acid radical in the carboxylate and by its other valence to a nuclear carbon of an aromatic structure in which none of the carbon atoms has direct linkage with any element other than hydrogen, carbon or mercury.

3. The method of preparing an organic mercury compound wherein a phenylmercury group is linked with a compound containing an =NH group by replacement of the hydrogen of the =NH group, which comprises reacting in an inert medium a compound containing an =NH group in which both bonds thereof are joined to a bivalent residue, with a soluble phenylmercury salt of a soluble acid.

4. The method of preparing an organic mercury compound wherein a phenylmercury group is linked with a compound containing an =NH group by replacement of the hydrogen of the =NH group, which comprises reacting in an inert liquid medium a compound containing an =NH group in which both bonds thereof are joined to a bivalent residue, with a soluble phenylmercury carboxylate of a soluble carboxylic acid.

5. The method of preparing an organic mercury compound wherein a phenylmercury group is linked with a compound containing an =NH group by replacement of the hydrogen of the =NH group, which comprises reacting in an inert liquid medium a compound containing an =NH group in which both bonds thereof are joined to a bivalent residue, with phenylmercury acetate.

6. The method of preparing an organic mercury compound wherein an aromatic mercury group is linked with an imido compound by replacement of an imido hydrogen, which comprises reacting in an inert liquid medium an imido compound with a soluble aromatic mercury salt of a soluble acid in which mercury is directly connected by one of its valences to the acid radical in the salt and by its other valence to a nuclear carbon of an aromatic structure in which none of the carbon atoms has direct linkage with any element other than hydrogen, carbon or mercury.

7. The method of preparing an organic mercury compound wherein an aromatic mercury group is linked with an imido compound by replacement of an imido hydrogen, which comprises reacting in an inert liquid medium an imido compound with a soluble aromatic mercury carboxylate of a soluble carboxylic acid in which mercury is directly connected by one of its valences to the acid radical in the carboxylate and by its other valence to a nuclear carbon of an aromatic structure in which none of the carbon atoms has direct linkage with any element other than hydrogen, carbon or mercury.

8. The method of preparing an organic mercury compound wherein a phenylmercury group is linked with an imido compound by replacement of an imido hydrogen, which comprises reacting in an inert liquid medium an imido compound with a soluble phenylmercury salt of a soluble acid.

9. The method of preparing an organic mercury compound wherein a phenylmercury group is linked with an imido compound by replacement of an imido hydrogen, which comprises reacting in an inert liquid medium an imido compound with a soluble phenylmercury carboxylate of a soluble carboxylic acid.

10. The method of preparing an organic mercury compound wherein a phenylmercury group is linked with an imido compound by replacement of an imido hydrogen, which comprises reacting in an inert liquid medium an imido compound with phenylmercury acetate.

11. The method of preparing an organic mercury compound wherein an aromatic mercury group is linked with a cyclic compound containing an =NH group by replacement of the hydrogen of the =NH group, which comprises reacting in an inert liquid medium a cyclic compound containing an =NH group the nitrogen of which is contained in the ring, with a soluble aromatic mercury salt of a soluble acid in which mercury is directly connected by one of its valences to the negative radical in the salt and by its other valence to a carbon of an aromatic structure in which none of the carbon atoms has direct linkage with any element other than carbon, hydrogen or mercury.

12. The method of preparing an organic mercury compound wherein an aromatic mercury group is linked with a cyclic imido compound by replacement of imido hydrogen, which comprises reacting in an inert liquid medium a cyclic imido compound in which nitrogen is contained in the ring, with a soluble aromatic mercury salt of a soluble acid in which mercury is directly connected by one of its valences to the negative radical in the salt and by its other valence to a carbon of an aromatic structure in which none of the carbon atoms has direct linkage with any element other than carbon, hydrogen or mercury.

13. The method of preparing an organic mercury compound wherein a phenylmercury group is linked with a cyclic compound containing an =NH group by replacement of the hydrogen of the =NH group, comprising reacting in an inert liquid medium a cyclic compound containing an =NH group the nitrogen of which is contained in the ring, with a soluble phenylmercury salt of a soluble acid.

14. The method of preparing an organic mercury compound wherein a phenylmercury group is linked with a cyclic imido compound by replacement of imido hydrogen, comprising reacting in an inert liquid medium a cyclic imido compound in which nitrogen is contained in the ring, with a soluble phenylmercury salt of a soluble acid.

15. The method of preparing an organic mercury compound wherein a phenylmercury group is linked with a cyclic compound containing an =NH group by replacement of the hydrogen of the =NH group, comprising reacting in an inert liquid medium a cyclic compound containing an =NH group the nitrogen of which is contained in the ring, with phenylmercury acetate.

16. The method of preparing an organic mercury compound wherein a phenylmercury group is linked with a cyclic imido compound by replacement of imido hydrogen, comprising reacting in an inert liquid medium a cyclic imido compound in which nitrogen is contained in the ring, with phenylmercury acetate.

CARL N. ANDERSEN.